US010843377B2

(12) United States Patent
Toncelli (10) Patent No.: US 10,843,377 B2
(45) Date of Patent: *Nov. 24, 2020

(54) METHOD, PLANT AND MOLDS FOR FORMING SLABS OF AGGLOMERATE (71) Applicant: Luca Toncelli, Bassano del Grappa (IT)

(72) Inventor: Luca Toncelli, Bassano del Grappa (IT)

(*) Notice: Subject to any disclaimer, the term of this patent is extended or adjusted under 35 U.S.C. 154(b) by 12 days.

This patent is subject to a terminal disclaimer.

(21) Appl. No.: 16/319,020

(22) PCT Filed: Jul. 14, 2017

(86) PCT No.: PCT/IB2017/054265
§ 371 (c)(1),
(2) Date: Jan. 18, 2019

(87) PCT Pub. No.: WO2018/015854
PCT Pub. Date: Jan. 25, 2018

(65) Prior Publication Data
US 2019/0217499 A1 Jul. 18, 2019

(30) Foreign Application Priority Data
Jul. 20, 2016 (IT) .................... 102016000076298

(51) Int. Cl.
B28B 7/36 (2006.01)
B29C 67/24 (2006.01)
(Continued)

(52) U.S. Cl.
CPC .............. B28B 7/364 (2013.01); B28B 7/384 (2013.01); B29C 33/60 (2013.01);
(Continued)

(58) Field of Classification Search
CPC ....... B28B 7/364; B28B 7/384; B29C 67/242; B29C 33/60; B29C 37/0075; B29C 33/68; B29K 2029/04
See application file for complete search history.

(56) References Cited

U.S. PATENT DOCUMENTS 3,492,384 A 1/1970 Matthews et al.
4,331,628 A 5/1982 Ziegler
(Continued)

FOREIGN PATENT DOCUMENTS

EP 0250012 A2 12/1987
GB 2233640 A 1/1991
(Continued)

OTHER PUBLICATIONS

PCT International Search Report and Written Opinion dated Sep. 22, 2017 for International Application No. PCT/IB2017/054265, from which the instant application is based, 11 pgs.

Primary Examiner — Joseph S Del Sole
Assistant Examiner — Jerzi H Moreno Hernandez
(74) Attorney, Agent, or Firm — Fredrikson & Byron, P.A.

(57) ABSTRACT

A method for preparation of a mold (10) intended to form a slab from a mixture of agglomerate comprising the steps of depositing over the mold surfaces a sheet (15) of PVA-based plastic material so as to form with it a surface for subsequent contact with the mixture introduced into the mold for forming the slab, whereby in at least some areas a layer (14) of a fluid agent containing PVA in a solution is interposed between the sheet (15) and the mold surfaces. A plant for carrying out the method and a method for production of a slab are also described.

25 Claims, 7 Drawing Sheets (51) Int. Cl.
*B29C 33/60* (2006.01)
*B29C 33/68* (2006.01)
*B29C 37/00* (2006.01)
*B28B 7/38* (2006.01)
*B29K 29/00* (2006.01)

(52) U.S. Cl.
CPC ........ *B29C 37/0075* (2013.01); *B29C 67/242* (2013.01); *B29C 33/68* (2013.01); *B29K 2029/04* (2013.01)

(56) References Cited

U.S. PATENT DOCUMENTS

| | | | |
|---|---|---|---|
| 4,702,877 A | 10/1987 | Davis, Jr. | |
| 6,627,694 B1 | 9/2003 | Toncelli | |
| 6,652,792 B1 * | 11/2003 | Klein | B30B 15/024 |
| | | | 264/219 |
| 2001/0023559 A1 | 9/2001 | Ozawa et al. | |
| 2004/0169303 A1 | 9/2004 | Brutti | |
| 2004/0207121 A1 * | 10/2004 | Schiller | B29C 33/68 |
| | | | 264/338 |
| 2019/0232524 A1 * | 8/2019 | Toncelli | B29C 67/243 |

FOREIGN PATENT DOCUMENTS

| | | | | |
|---|---|---|---|---|
| JP | 2546940 Y2 | 9/1997 | | |
| JP | 3772242 B2 | 5/2006 | | |
| JP | 4676607 B2 | 4/2011 | | |
| JP | 5286152 B2 * | 9/2013 | | |
| JP | 5286152 B2 | 9/2013 | | |
| JP | 5495287 B2 * | 5/2014 | | |
| JP | 5495287 B2 | 5/2014 | | |
| KR | 0169784 B1 * | 3/1999 | ......... | B29C 45/1418 |
| KR | 0169784 B1 | 3/1999 | | |
| KR | 20080064152 A | 7/2008 | | |
| KR | 101306296 B1 | 9/2013 | | |
| WO | 8807416 A1 | 10/1988 | | |

\* cited by examiner

METHOD, PLANT AND MOLDS FOR FORMING SLABS OF AGGLOMERATE

RELATED APPLICATIONS

This application is a 35 U.S.C. 371 national stage filing from International Application No. PCT/IB2017/054265, filed Jul. 14, 2017, which claims priority to Italian Application No. 102016000076298, filed Jul. 20, 2016, the teachings of which are incorporated herein by reference.

The present invention relates to a method and a plant for the preparation of molds and the forming of slabs of agglomerate, for example agglomerate of stone material granules or powder bonded with a hardening resin. The present invention also relates to a mold prepared using this method and to a method for production of the slabs.

In the production of slabs of agglomerate, after the material for forming the slabs has been poured into the molds and hardened, preferably after any vacuum vibrocompression, it is necessary to separate the mold from the slab thus formed.

The molds are preferably made in the form of flexible sheaths of elastomer material, such as synthetic rubber, and are usually composed of a bottom sheet of rubberized fabric, generally in the form of a tray with edges, and a top closing sheet of rubberized fabric. Such a mold, once filled with an agglomerate mixture, then receives from the outside a suitable vacuum vibrocompression force in order to shape the slab.

Over time a number of solutions have been developed in an attempt to prevent the hardened sheets from adhering to the mold, in particular to the bottom rubber sheet and the top rubber sheet of the elastomer mold, and protect the rubber sheets from attack by the resinous binders with any associated solvents.

For example, in IT1311857 it was proposed spraying beforehand onto the surface of the rubberized sheets a fluid separating/protective agent formed essentially by a solution based on PVA (polyvinyl alcohol), before pouring the mixture into the tray.

After the separating agent has dried, a thin solid and elastic film, which adheres moderately to the surface of the rubberized sheets, is thus formed. The adhesion of the PVA film to the rubberized sheets, although weak, prevents the formation of undulations or wrinkles on the film, and therefore on the surface of the slab, during vibrocompression step. This film provides protection for the sheets of the mold from the resin and solvents, such as styrene, and also allows separation of the sheets from the hardened slab at the end of the hot catalysis process.

This occurs both for the bottom rubberized sheet onto which the mixture is poured and for the top rubberized sheet which covers the mixture.

The PVA film instead adheres firmly to the hardened slab and is extracted from the mold together with the slab. During the subsequent processes for wet polishing and sizing of the slab the film is then dissolved by the process water and evacuated together with the wet processing sludges.

The PVA film may if necessary be mechanically peeled off from the slab instead of being dissolved in water.

This solution, although effective, has a number of drawbacks associated with the fact that the protective/separating agent is fluid so that it must be applied, normally by means of spraying, and then dried.

In order to obtain a sufficiently compact layer normally a relatively high quantity of fluid, for example about 200 g/m$^2$ is applied so as to obtain, after drying, a film of about 30 to 40 g/m$^2$.

There is, however, the real risk that the agent may be sprayed not uniformly over the entire mold or that bubbles or voids may be formed and that these, after drying, may produce pores in the film with the risk that solvents may pass through and consequently damage the elastomer mold.

It has also been proposed spraying the fluid agent at a relatively high-temperature (for example about 50° C.) in order to ensure a sufficient fluidity, with the risk, however, that the water present in it may evaporate excessively during application, with the consequent loss of the fluid characteristics which are required for correct application of the layer.

It is however also necessary to clean regularly the nozzles, an operation which is by no means simple in view of the sticky nature of the solution, in order to ensure uniform spraying of the layer.

Moreover, the large amount of solution which is needed for spraying requires time and attention during drying in order to eliminate all the considerable quantity of water in the solution, while keeping at the same time the thickness of the sprayed layer sufficiently uniform.

Finally, it should be considered that, after spraying, drying of the PVA solution must be performed in suitable drying ovens in order to obtain sufficiently rapid drying before being able to pour the mixture into the mold. Oven drying is, however, a delicate process which must be carried out carefully in order to prevent boiling and/or the formation of bubbles and pitting.

Moreover, the presence of ovens results in an increase in the overall dimensions and costs of the plant and a substantial increase in the amount of electric energy used during the process. The oven accelerates the drying process, but complete drying nevertheless requires a certain amount of time.

For these reasons other solutions have been developed, these envisaging protecting the mold using solid sheets of suitable material which are placed directly on the bottom and on the walls of the bottom mold before pouring in the mixture.

The sheet must be chosen so as to have the characteristics necessary for use in the mold as a means for protecting and facilitating separation of the mold from the slab. For example it must be impermeable to organic vapors, in particular styrene, impermeable to the liquid resin, resistant to the catalysis temperatures of the resin, and resistant at high temperatures to the solvents and chemical vapors which develop during the slab production process.

Sheets of plastic material (polypropylene or PET or PVA) have therefore been devised, these being combined where necessary with a sheet of paper having an overall gram weight of about 40 to 250 g/m$^2$.

After hardening of the layer of mixture, the hardened slab thus obtained is extracted from the mold together with the sheet which remains attached thereto. The sheet must then be removed from the slab.

If it is made of PVA, the sheet may be simply dissolved in water at room temperature; otherwise it must be removed and eliminated in solid form, i.e. being mechanically removed from the slab.

US2004/169303 describes an example of use of a sheet of water-soluble plastic material.

This procedure is also effective but has the drawback that the protective sheet, since it simply rests on and does not adhere to the rubberized sheets, may form undulations or wrinkles or folds which penetrate into the layer of mixture during vibrocompression of the mixture inside the mold and then remain within the hardened slab.

During sizing and polishing of the slabs it is therefore necessary to remove mechanically any trace of paper or plastic film which has penetrated into the slab. It is clear that, owing to the paper and/or plastic film which has penetrated into the mixture, an extra thickness of material, which in some cases may also be quite large, must be removed. Even in the case of PVA which dissolves in water it is nevertheless necessary to remove a layer of material of the slab sufficient to ensure disappearance of the defects which have been created in the slab following trapping of the sheet inside the mixture.

This requires, therefore, on the one hand the production of slabs which are thicker in order to obtain a suitable extra thickness to be removed, and on the other hand, subsequent sizing allowing for a greater machining depth so that the paper and/or the PVA or polypropylene trapped in the slab may be removed in order to avoid the consequent defects.

If this procedure is not adopted, it is required to make do with low-quality slabs.

The general object of the present invention is to provide a method, plant and a mold for the production of slabs of agglomerates which are able to overcome, among other things, the aforementioned drawbacks of the prior art and allow slabs of satisfactory quality to be obtained in a rapid manner.

In view of this object, the idea according to the invention is to provide a method for the production of slabs from a mixture of agglomerate, comprising the steps of preparing a mold, intended to form a slab from the mixture of agglomerate, depositing over surfaces of the mold at least one sheet of PVA-based plastic material so as to form with it a slab a surface for subsequent contact with the mixture that will be introduced into the mold, a layer of a fluid agent containing PVA in a solution being interposed between the sheet and at least some areas of the mold surfaces.

Still according to the invention, the idea is also to provide a method for the production of slabs of agglomerate, comprising the steps of preparing a mold using the aforementioned method, introducing into the mold a mixture of agglomerate for forming a slab; forming the slab, preferably by means of vacuum vibrocompression; carrying out a process of hardening of the mixture contained in the mold in order to consolidate the slab; extracting from the mold the hardened slab together with the sheet; eliminating the sheet from the slab. Elimination may be advantageously performed by means of simple dissolution.

Still according to the invention, a further idea is to provide a plant for performing the steps according to the method of the preceding claims, characterized in that it comprises in sequence a first station for application of the layer of fluid agent on at least some areas of the surface of the mold and a second station for deposition of the sheet of PVA-based plastic material on the layer, and a conveyor which travels between the first and second stations and is intended to convey sequentially a mold into the first and second stations for application of the layer of fluid agent and deposition of the sheet, or, alternatively, displacement of the two stations above the mold which is immobile.

A further idea is to provide a mold intended to form a slab from a mixture of agglomerates, comprising a base portion and a cover having a surface inside the mold which is covered by at least one sheet of PVA-based plastic material so as to form with it a surface which is intended for subsequent contact with the mixture introduced into the mold for forming the slab, between the sheet and at least some areas of the said internal surface of the mold there being present a layer of a PVA-containing adhesive agent. The mold may also comprise suction ducts which are intended to connect a space between surfaces of the mold and the sheet to external suction means for flattening or stretching the sheet against the mold surfaces by means of a vacuum.

In order to illustrate more clearly the innovative principles of the present invention and its advantages compared to the prior art, possible examples of embodiment applying these principles will be described below with the aid of the accompanying drawings. In the drawings.

Figure 1:
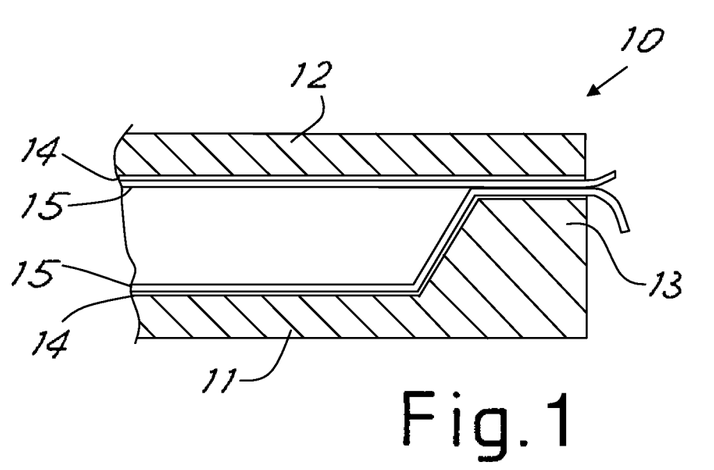
FIG. 1 shows a schematic, partial, cross-sectioned view of a mold prepared according to the invention.

With reference to the figures, FIG. 1 shows a partial, schematic, cross-sectional view of a mold, according to the invention, denoted generally by 10.

The mold 10 is advantageously a mold made of flexible, preferably polymeric, material, such as synthetic rubber, including silicone-type rubber, and comprises a bottom part 11 and a top part 12. Cloth or fabric reinforcing layers consisting a substantially non-stretchable material (not shown) may also be provided on the outer or inner surfaces or inside the material forming the mold.

The bottom part 11 is preferably realized in the form of a tray, namely with raised peripheral edges 13 and is suitable for receiving in a die cavity inside the mold a known mixture for forming a slab. The mixture may be a known mixture of agglomerate, for example an agglomerate of stone material granules or powder bonded with a hardening resin. Here the term "die cavity" is understood as referring to the cavity in the mold which receives the mixture and which is therefore defined within the peripheral edge of the mold by the internal surface of the said mold.

The top part 12 is preferably substantially flat and forms a cover for closing the bottom part. Advantageously, the mold may be of the type used for the known method of forming the slabs by means of vacuum vibrocompression, i.e. once the mixture has been poured in and the mold closed at the top it is conveyed to a compacting station where it undergoes a vacuum compression action with simultaneous application of a vibratory movement. Then the compacted mixture is transferred to a station for hardening the resin, preferably by means of heat application.

This type of mold is usually indicated by the technical term "sheath".

Before distributing the mixture inside the mold, the mold is prepared so as to facilitate the subsequent extraction of the hardened slab and protect the mold surfaces which otherwise would come into contact with the mixture.

The preparation comprises the deposition of a sheet 15 of PVA-based plastic material over the surfaces of the mold 10, be it the bottom part 11 or the top part 12, with a layer 14 of a fluid agent containing PVA (polyvinyl alcohol) in a solution interposed between at least some areas of the sheet 15 and the surfaces of the mold as will be explained below.

The sheet 15 forms the surface for subsequent contact with the mixture introduced into the mold for forming the slab.

The PVA solution used for the layer 14 may be advantageously formed by PVA in an aqueous solution. It may also envisage, preferably, the addition of glycerin. This solution may consist, for example (referred to the percentage weight) of about 1% to about 25% of PVA, about 62% to about 95% of water, and about 1% to about 10% of glycerin.

Additives, such as known anti-foam, leveling and precipitating additives, may also be used.

For example, the following compositions were tested (values expressed as percentage by weight):

| Substance | Comp. 1 | Comp. 2 | Comp. 3 | Comp. 4 | Comp. 5 | Comp. 6 | Comp. 7 |
|---|---|---|---|---|---|---|---|
| H2O | 79 | 66.8 | 90.8 | 86.1 | 62.1 | 95.1 | 71.1 |
| PVA | 12.8 | 25 | 1 | 1 | 25 | 1 | 25 |
| Glycerin | 5.3 | 5.3 | 5.3 | 10 | 10 | 1 | 1 |
| Additives | 2.9 | 2.9 | 2.9 | 2.9 | 2.9 | 2.9 | 2.9 |
| TOTAL | 100 | 100 | 100 | 100 | 100 | 100 | 100 |

Composition 1 is the composition which is preferred, even though compositions 2 to 7 may be used in accordance with the principles of the invention. Other compositions may however be used.

It has been found to be particularly advantageous if the layer of fluid agent is applied onto the mold surface by means of mechanical contact of an applicator element soaked with said fluid agent against the surface of the mold. This ensures the application and the consequent formation of a thin uniform thickness of fluid. Application may be performed for example by means of rolling or sponging.

The average quantity of fluid agent applied may be preferably between 2 to 10 $g/m^2$, and more preferably between 4 and 6 $g/m^2$.

This ensures a sufficient uniformity of coverage without using an excessive amount of fluid agent, which must have a small thickness (preferably less than 10 μm) in order to ensure a reasonable adhesion of the solid PVA film to the surface of the mold and at the same time avoid the risk of solubilizing and damaging the said film.

However, application by means of spraying, even though difficult to perform in view of the very small thickness, may also be employed.

The PVA-based sheet may be realized in the form of a solid film, for example with a thickness of between 30 and 50 μm and, preferably, around 35 μm.

This sheet may advantageously have a gram weight of between 20 $g/m^2$ and 60 $g/m^2$ and preferably between 30 $g/m^2$ and 50 $g/m^2$.

After application of the sheet it has been found to be advantageous to perform flattening of the sheet against the mold surface in order to reduce or, preferably, eliminate any voids or air bubbles present between the sheet and the underlying mold surface.

Flattening is particularly advantageous in the case where a subsequent vacuum vibrocompression process is carried out because any bubbles present underneath the sheet would expand during the vacuum process, causing separation of the film from the sheet.

Advantageously, flattening may be performed by means of a direct mechanical action on the sheet or by means of a pneumatic action involving suction of the air between sheet and mold. In the first case, flattening may be performed advantageously by means of rolling or brushing, namely using, for example, a soft roller or a brush which are passed over the sheet with suitable pressure. This is advantageous in the case of shallow mold parts, such as the mold cover.

In the second case, which is preferable for example for deeper mold parts, such as the tray or base of the mold which receives the mixture, the sheet, owing to its extendable nature, may be sucked against the mold surfaces by means of suction of the air between the mold and the sheet. In this case, the sheet is preferably fixed beforehand to the mold along a peripheral edge, as will become clear below.

Advantageously, the adhesive fluid layer between sheet and at least some areas of the mold ensures an adequate moderate adhesion of the sheet 15 to the mold surface. This adhesion is useful for keeping the sheet in position and for preventing the formation of folds or wrinkles in the sheet during the subsequent processing steps, but at the same time does not hinder subsequent voluntary separation of the sheet from the mold after formation of the slab, as will become clear below.

In fact, the very small quantity of water-based fluid agent forms an adhesive and results in partial limited dissolving of the surface of the solid PVA film, allowing the necessary adhesion thereof to the underlying surface of the rubberized mold. The small quantity of water present in the adhesive agent is incorporated within the film structure.

The quantity of the fluid agent is in any case sufficiently small to avoid complete dissolution of the PVA film.

The fluid layer is thus incorporated within the structure of the PVA-based sheet and therefore does not have a negative effect on the latter, but only ensures the desired adhesion thereof to the mold.

It should also be noted that the use of a fluid adhesive agent consisting of a PVA solution allows application to be performed in very small quantities, without the risk of leaving "patchy zones', namely zones which are not suitably covered by the fluid.

The layer of adhesive agent ensures that the sheet adheres sufficiently to the mold, but also nevertheless ensures subsequent easy removal of the slab from the mold.

Advantageously, using a PVA solution and a PVA-based sheet offers the advantage that they may be subsequently completely removed from the slab simply by means of washing with water (also during the normal mechanical slab wet-polishing and finishing operations) or by means of mechanical peeling.

There is instead no need for a deep mechanical removal operation since the adhesion of the sheet to the mold, as occurs in accordance with the principles of the invention, ensures that there is no formation of wrinkles or folds which may be incorporated in the slab forming mixture.

Figure 2:
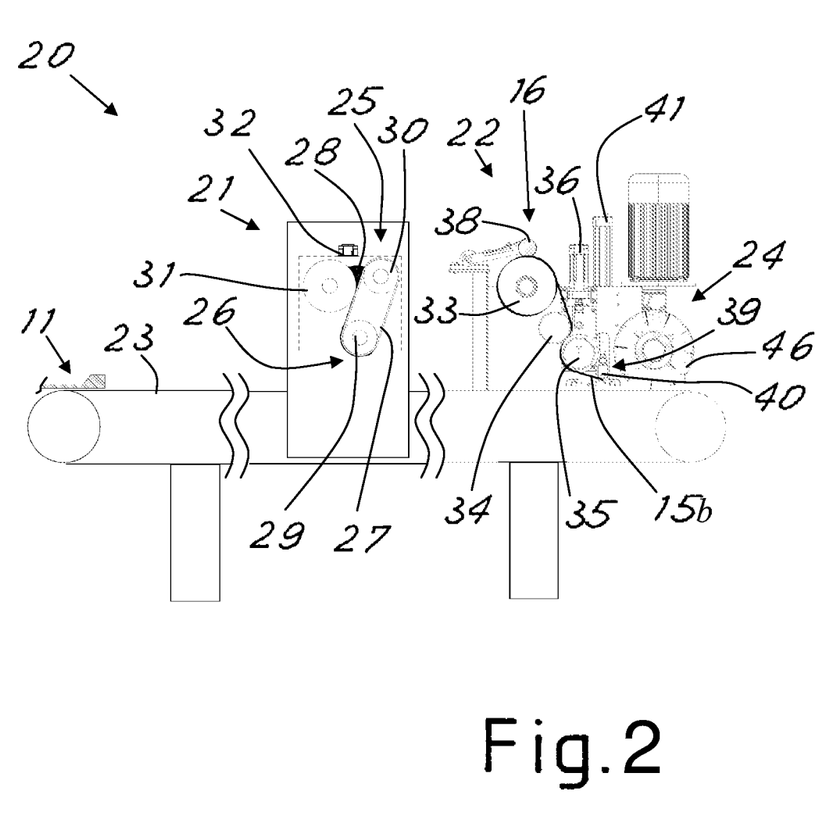
FIG. 2 shows a schematic side elevation view of a plant according to the invention.

FIG. 2 shows a schematic view of a plant for preparation of molds, according to the invention, applying the aforementioned method.

For the sake of simplicity in the description below, reference will be made to the preparation of the bottom part or tray of the mold, but, as will be clear to the person skilled in the art, the same plant may be used for the similar preparation of the top part or cover of the mold, inserting this top part into the plant in an overturned position with respect to that shown in FIG. 1. For the sake of convenience below reference will be made in any case generically to a mold, without distinguishing between the bottom part and top part.

Obviously the same plant may be used for the preparation, in sequence, of the top part and bottom part of the mold, or alternatively two plants may be used, i.e. one intended for the preparation of the top parts and the other one intended for preparation of the bottom parts of the molds.

As can been seen in FIG. 2, the plant (denoted generally by 20) comprises a first station 21 for applying the layer of fluid agent in the predetermined zones of the mold and a second station 22 for depositing the sheet of PVA-based plastic material.

A conveyor 23 (preferably of the belt type) is advantageously arranged between the two stations, said conveyor running underneath and between the first and second stations and being intended to transport the mold sequentially into the two stations; alternatively, the two stations could be displaced above the mold which is kept immobile. In other words, the stations may also be designed such that they are mobile and can be displaced above the mold, instead of displacing the mold underneath the stations.

A flattening device may be arranged downstream of the sheet application zone.

For example, in a first embodiment according to the invention, by way of an accessory element it may be advantageously envisaged that the second station 22 comprises or is followed by a flattening device 24 which, upon passing of the mold, performs mechanical flattening of the sheet 15 against the surface of the mold 10.

The first station 21 is intended to distribute uniformity the layer of fluid agent on predetermined surfaces of the mold which passes underneath it, transported by the conveyor 23 and with its surface to be treated directed upwards. Application of the fluid agent allows the sheet to be suitably fixed to the mold for the subsequent processing operations.

Advantageously, the first station 23 may comprise an applicator element 25 which is soaked or coated with the fluid agent so as to transfer the fluid agent by means of contact onto the surface of the mold passing below it, in a fluid release zone 26.

In particular, it has been found to be advantageous if the applicator element comprises a belt 27 running between a zone 28 for removal of the fluid supplied by a fluid reservoir (for example a fluid tank, not shown), where it is soaked or coated with fluid, and the fluid release zone 26. The travel movement advantageously occurs in the direction of travel of the mold underneath the station.

The belt is made with a material suitable for absorbing and/or collecting a certain quantity of fluid and conveying it to the release zone 26 where it may be transferred onto the desired areas of the mold surface.

In a possible preferred embodiment, the belt 27 is wound around two rollers 29 and 30 transverse to the movement of the mold. The first roller 29 is situated at the bottom so that the belt which is wound around it is located in the fluid release zone 26 where the fluid comes into contact with the desired parts of the mold surface to be coated.

The second roller 30 is instead situated in a top position and preferably in such a way that the belt has at least one section between the two rollers which is inclined towards the direction of advancing movement of the conveyor 23, with an upwardly directed side which is that designed to remove the fluid from the fluid reservoir. Means for transferring onto the belt the fluid to be applied to the mold are present along the advantageously inclined section, before the moving belt 27 reaches the release zone. These means may be of various types, as may be easily imagined by the person skilled in the art For example, it has been found to be advantageous to use a third roller 31, parallel to the first two rollers, placed in contact with the upwardly directed side of the moving belt.

The three rollers and the belt obviously extend transversely with respect to the conveyor so as to be able to cover the entire width of the mold surface to be treated.

As can be seen in FIG. 2, the removal zone 28 for pouring of the fluid is formed between the belt and a third roller, said fluid being accumulated between the belt and the third roller and being conveyed in small quantities by the belt towards the release zone 26.

The third roller 31, in order to facilitate adhesion of the fluid onto the belt, is preferably arranged so as to be counter-rotating relative to the belt 27.

The belt basically operates in the manner of a stamping machine which removes the fluid and distributes it onto the surface of the mold in contact with the belt in the release zone 26.

Distribution of the fluid therefore essentially takes place by means of rolling or sponging.

The fluid application device is advantageously provided with pneumatic pistons 32 for being able to adjust the vertical position of the applicator element so as to allow, for example, the passage of raised mold parts (for example the rim 13) and so as not to contaminate with the fluid parts which must not be coated. The device may for example be raised when a mold is not present underneath the station, so as to avoid soiling the conveyor.

Figure 3:
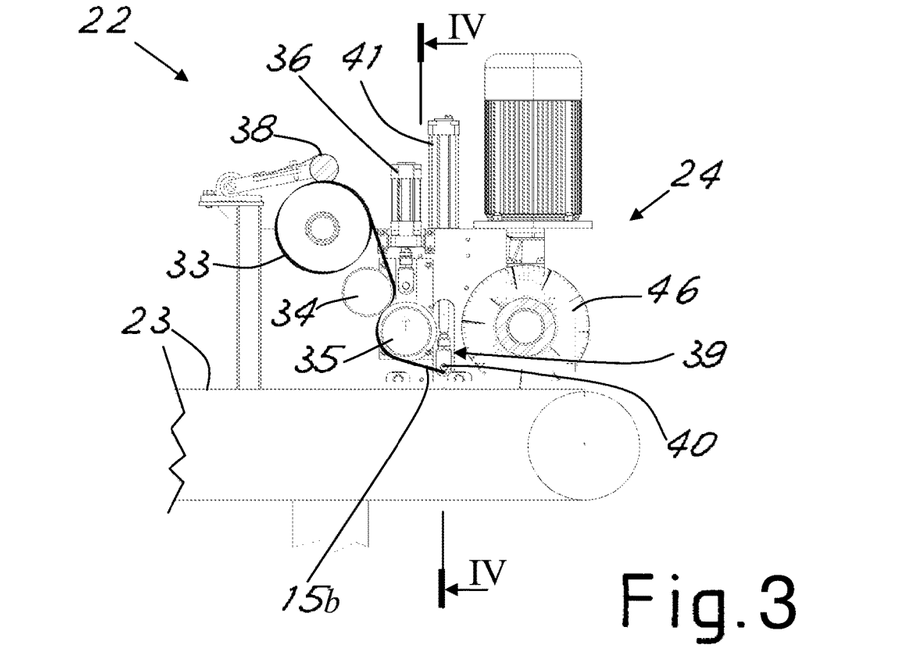
FIG. 3 shows a schematic view on a larger scale of a station of the plant shown in FIG. 2.
Figure 4:
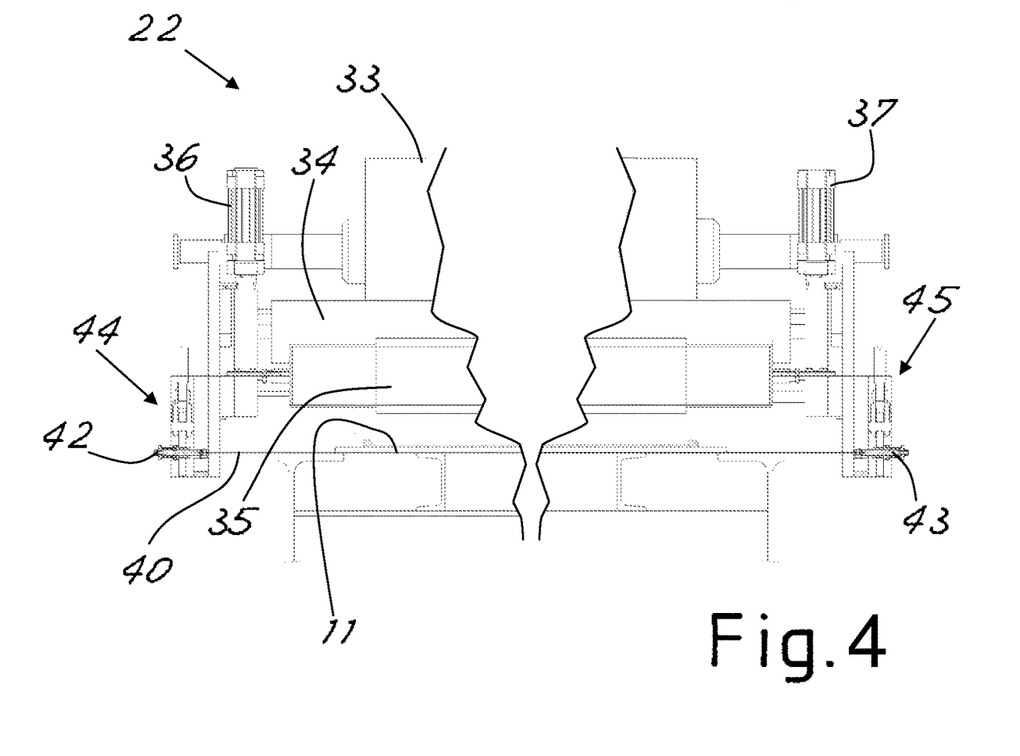
FIG. 4 shows a partial, schematic, cross-sectional view along the line IV-IV of FIG. 3.

FIGS. 3 and 4 show in greater detail the second station 22 and the flattening device 24, where present.

The second station 22 may comprise a release device which may release single sheets previously prepared to the correct length. However it has been found to be advantageous if the station 22 comprises a feeder device 16 which releases the sheet 15 in the form of a continuous strip of film (indicated by 15*b*) which is unrolled from a reel 33 with its axis transverse to the direction of movement of the mold underneath the release device and then cut to size.

Preferably, unrolling of the plastic film may be performed autonomously since the plastic film adheres to the surface of the mold on account of the adhesive fluid which has just been applied.

This ensures precise application of the film without wrinkles, due to excessively fast feeding, or rips or tears, due to slow feeding of the film.

In particular, according to a possible structure of the plastic film feeder device, the plastic film 15*b* unrolled from the reel 33 passes from one or more transmission rollers 34 over which the film runs and then from a final roller 35 which has the function of extending the plastic film over the surface of the mold with which it is in contact.

At least the final roller 35 is movable vertically so as to be able to be moved towards or away from the underlying conveyor 23 so as to, respectively, press the film with suitable force against the surface to be covered and/or allow the peripheral rim of the trays to pass underneath, as will be explained more fully below.

In order to perform this vertical movement a pair of pneumatic pistons 36, 37 are provided, as can be clearly seen in FIG. 4.

Advantageously, above the reel 33 of plastic film there may be a further roller 38, which is preferably soft and may have a brush-like form, said roller being elastically pushed against the periphery of the reel 33 and having the function of smoothing the plastic film, if necessary, in order to prevent or reduce subsequent trapping of air bubbles between sheet and deposition surface inside the mold and prevent wrinkling of the sheet before it is applied onto the mold.

The roller 38 may also prevent uncontrolled unrolling of the reel, maintaining a correct tension of the plastic film between the reel and the following rollers 34 and 35.

In order to perform cutting to size of the strip of film for forming the sheet on the mold, advantageously a cutting device 39 is provided, said device being arranged transverse to the strip of unrolled film and advantageously situated downstream of the roller 35.

In particular, it has been found to be advantageous to provide the cutting device 39 with a wire 40 heated to the temperature needed to melt the material of the film and arranged transverse to the direction of feeding of the mold. Motor-driven means 41 (for example one or more pneumatic pistons) move upon command the wire 40 between an non-operative raised position, where it does not interfere with the plastic film, and an operative, lowered, cutting position where the wire is arranged against the plastic film. As can be seen in FIG. 4, the wire is advantageously supported and tensioned between its two ends 42, 43 which are situated on the sides of the conveyor 23 and on which the motor-driven means 41 act via connections and linkages 44 and 45. The movement of the wire between its two—non-operative and operative—positions may be vertical so as to be lowered onto the film once the film has been deposited onto the mold.

Advantageously the wire is metallic and heated by means of the Joule effect via an electric current which flows in it thanks to an electric power supply (not shown) connected to its two ends 42 and 43.

As can be clearly seen again in FIG. 3, the optional flattening device 24 (used in a first possible embodiment of the invention to apply a mechanical flattening action) comprises preferably a pressure roller 46 with the axis of rotation which is transverse to the direction of movement of the conveyor and which is pushed towards the conveyor so as to act on the sheet deposited on the mold surface and press it against the mold surface when the mold passes underneath it. This pushing action may be obtained, for example, by means of suitable elastic supporting of the roller 46, the weight itself of the roller, a yielding design of the peripheral surface of the roller, or a combination of these three characteristics.

The pressure roller 46 may, for example, be made with a peripheral surface which is soft and compressible or in the form of a brush.

During use of the plant, the mold part (tray or cover) to be treated is moved on the conveyor 23 with the side to be treated directed upwards, as shown schematically in FIG. 2. As already mentioned, the figures relating to the plant show for the sake of simplicity the bottom mold part or tray 11. A similar treatment may be applied to the top part or cover 12 of the mold which must close the mixture inside the mold.

Initially both the station 21 for applying the layer of fluid agent and second station 22 for depositing the sheet of plastic material are in their rest position, namely respectively have the fluid applicator element 25 and the plastic film feed device raised.

When the front end of the mold (front end and rear end are understood as being in relation to the movement of the mold along the plant) reaches the first station 21, the fluid applicator element 25 is lowered so that it comes into contact with the surface of the mold to be treated with the fluid.

Figure 5:
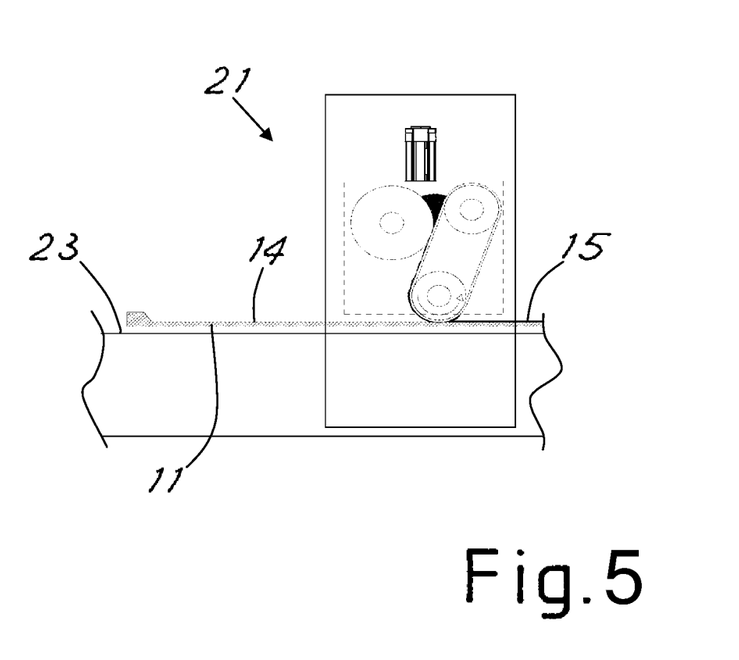
FIG. 5 illustrates an operating step of another station of the plant shown in FIG. 2.

FIG. 5 shows a first possible application procedure according to the invention. According to this first procedure, the applicator element 25 is lowered so as to come into contact substantially with the whole surface of the mold which must then receive the sheet (where necessary avoiding only the rim of the tray 11). In particular, the fluid is applied onto the bottom of the mold.

The advancing movement of the mold allows the deposition of the desired fluid layer over the whole surface of the mold to be treated, as can be clearly seen in FIG. 5. When the rear end of the mold passes by the applicator element 25 is raised and application of the fluid terminates.

When the front end of the mold reaches the second station 22 the device for feeding the plastic film 16 is operated so as to start dispensing of the plastic sheet. In particular, in case of the plant shown in FIG. 6, the roller 35 is lowered so that the front portion of the plastic film is pushed towards the surface of the mold covered with fluid.

Figure 6:
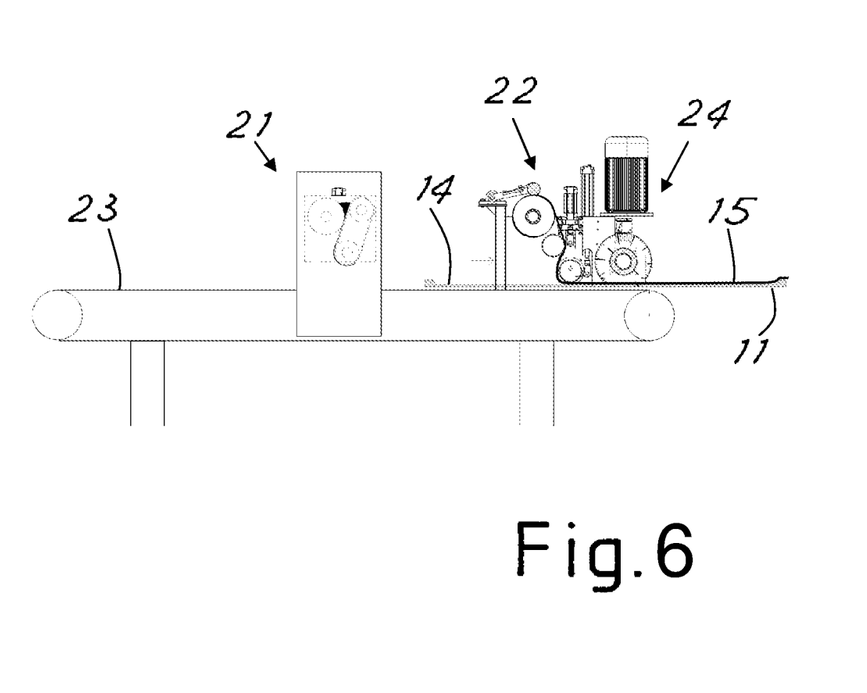
FIGS. 6 and 7 illustrate operating steps of the station of the plant shown in FIG. 3.

In this condition, the advancing movement of the mold allows the film to be conveyed and deposited on the mold surface, as can be clearly seen in FIG. 6. Once the rear end of the mold has passed by the roller 35 is raised and application of the film terminates.

As can be seen again in FIG. 6, in the case where the flattening device 24 is present, it is operated so as to cause the plastic film to adhere to the surface of the mold, thus preventing the trapping of air bubbles.

Figure 7:
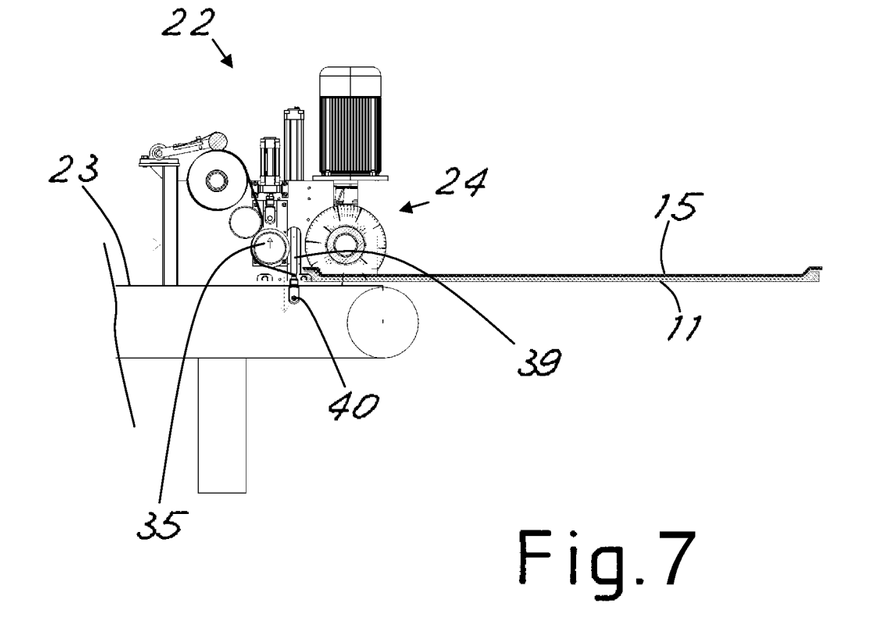

As can be seen in FIG. 7, once application of the plastic film has been completed, the roller 35 is raised and remains in this position. The cutting device 39 is instead operated so as to cut and separate the part of film which has been dispensed onto the mold, creating a new front portion for the next dispensing operation which takes place upon arrival of a new mold.

The flattening device instead continues its action and completes the operation.

As already mentioned above, the application of the fluid over the whole surface of the mold which must be covered by the sheet is preferable in the case of a shallow mold. For example, the procedure described above may be advantageously used for covering the cover of the mold.

In the case of deeper molds, purely mechanical application of the sheet might not always be satisfactory.

In this case it has been found to be advantageous to perform "pneumatic" flattening of the sheet, using a flattening device which is arranged downstream of the sheet application zone and which acts by means of a vacuum system instead of a system with the aforementioned mechanical device 24.

In the case of a vacuum flattening action it has also been found to be advantageous if the fluid is applied only on some zones of the mold surfaces which must be covered by the sheet. In particular, it has been found to be advantageous to apply the fluid only in peripheral zones of the mold, so as to define a central area from which the air may be sucked.

Figure 8:
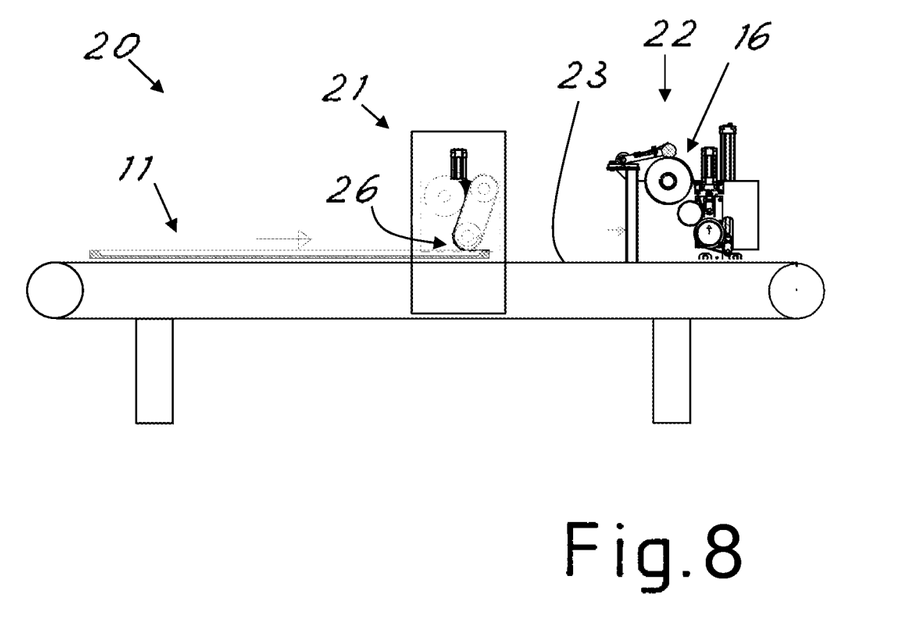
FIGS. 8 and 9 show operational variants of a plant according to the invention.

This variant of the method according to the invention is shown by way of example in FIG. 8.

According to this variant, when the front end of the mold reaches the first station 21, the fluid applicator element 25 is lowered so as to come into contact with only the peripheral edge or the rim of the mold. In this way, in the first working station, the PVA-based adhesive is distributed using the method already described above, but only on the top peripheral edge of the mold (for example the tray).

Figure 9:
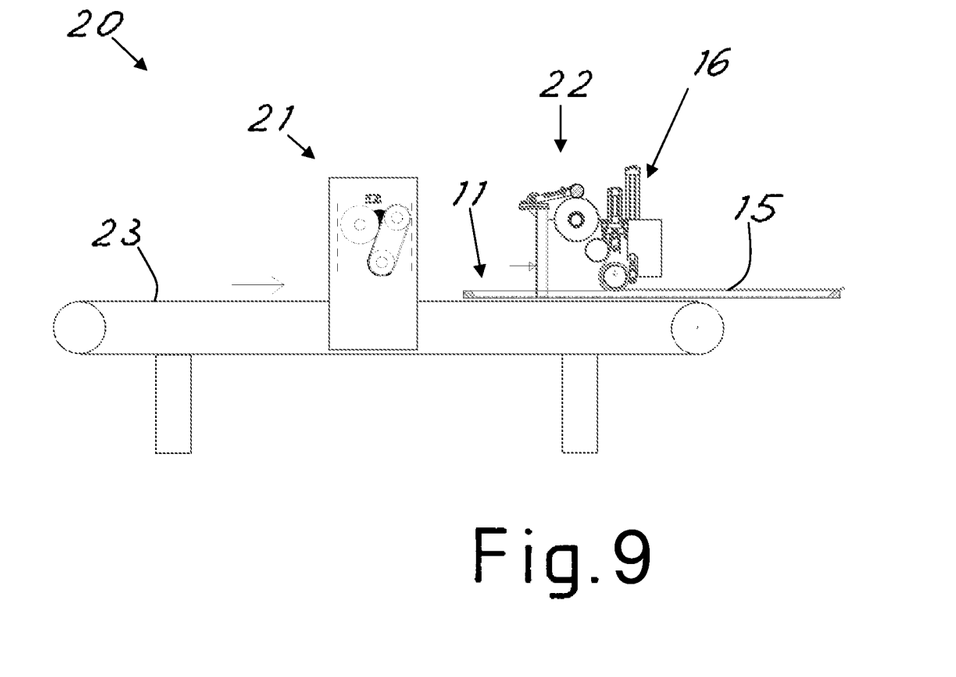

As can be clearly seen in FIG. 9, the mold thus treated then passes to the sheet deposition station 22, where the sheet is stretched over the mold so as to adhere to the peripheral rim of the mold treated with the adhesive fluid. In this way, the sheet is arranged so as to remain horizontal and spaced from the bottom of the mold and, owing to the PVA-based adhesive and its lightness, it remains perfectly in position (like the skin of a drum) over the mold die cavity.

In the station 22 the optional flattening device 24 is not used (and may therefore also not be present, as can be seen from FIG. 9). If, instead, air suction is subsequently used, advantageously it is performed via suction ducts arranged in the mold so as to emerge inside the mold interior defined by the peripheral edge of the mold. Suction means will therefore be provided instead of the flattening device 24.

Figure 10:
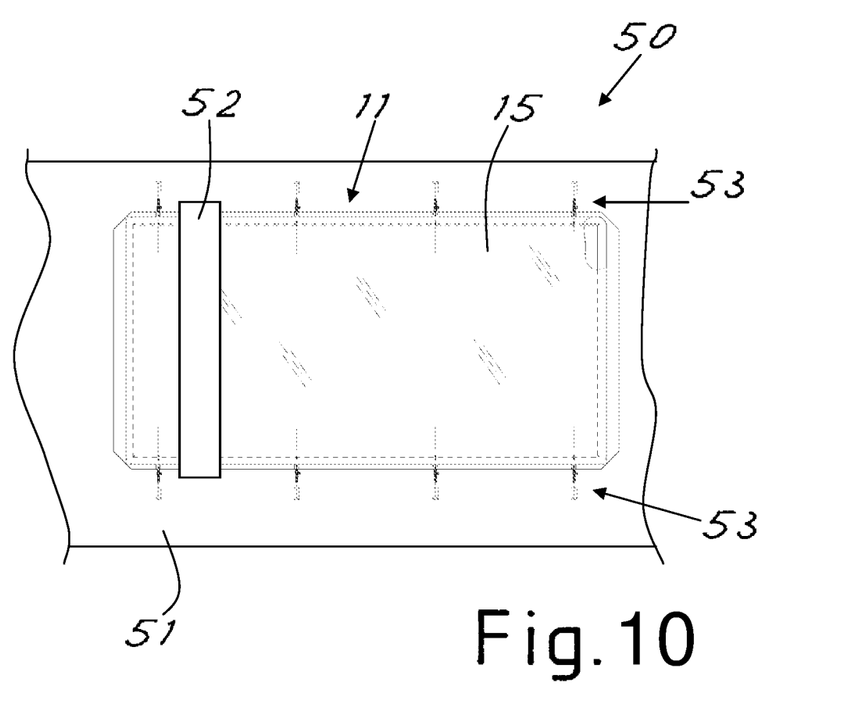
FIG. 10 shows a schematic plan view of a further processing station of a plant according to the invention.
Figure 11:
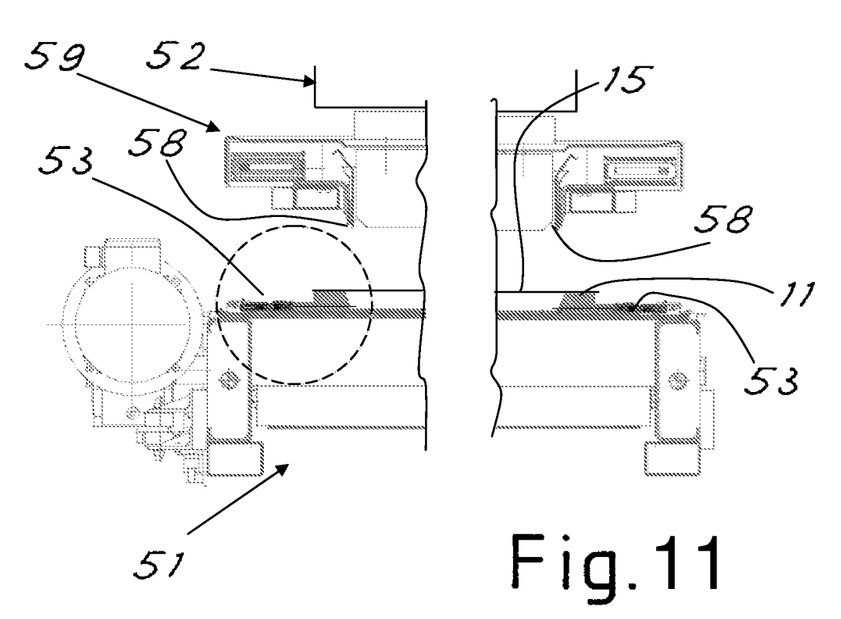
FIG. 11 shows a schematic partial view of a cross-section of the station according to FIG. 10.

In particular, the mold 11 with the sheet applied may pass to a following station 50, called mixture distribution and spreading station, shown schematically in a top view in FIG. 10 and in a cross-sectional view in FIG. 11.

In this station the mixture is normally poured into the mold, the station usually comprising transportation means 51 (for example a known belt conveyor) which moves the mold 11 opposite a known distribution unit 52 which is able to distribute the mixture inside the mold in the correct amount. In the case where the solid film is positioned inside the mold according to the first embodiment of the present invention, the station 50 will be substantially of the known type, as may be easily imagined by the person skilled in the art.

The mixture is generally poured into the mold by means of a longitudinal relative movement of the mold and distribution unit 52, with the distribution unit extending transversely over the whole width of the mold. The distribution unit and the relative movement with respect to the mold are known per se and will therefore not be illustrated or described here further, being able to be easily imagined by the person skilled in the art.

Preferably, it will be the unit 52 which moves along the mold, which is kept stationary inside the station 50. However a movement of the mold underneath the unit 52 which remains stationary, or a combined movement of mold and unit, may also be used if desired.

The distribution will be advantageously performed by means of a known "loosening" action where the mixture is spread out so as to level the free surface of the mixture inside the mold.

According to the invention, before pouring of the mixture, flattening of the sheet which has been arranged on the mold during the already previously described step is performed.

If the film has been fixed on the top peripheral edge of the mold and not yet flattened, as shown in FIG. 9, the vacuum flattening or stretching device 53 may be directly present in the station 50 so as to perform the flattening/stretching step by means of suction of the air trapped in between the sheet and mold before and in some cases also during distribution of the mixture.

For this purpose, the spreading station 50 may advantageously comprise suction means which form the vacuum flattening device 53 and which are suitably connected to the mold 11 reaching the station, so as to remove the air trapped between the sheet 15 and the mold surface.

In particular, the suction means may be arranged in the station 50 along peripheral edges of the mold so as to link up (connect) with suitable suction ducts present in the said mold (ducts which have for example a diameter of about 6-10 mm) and which connect the internal cavity of the mold underneath the sheet 15 to the exterior of the mold.

Advantageously, the edges of the mold where the suction means are arranged may be the two opposite longitudinal edges so that the mold may be arranged between the suction means 53 by means of the same transportation movement which brings the mold inside the station 50.

The passages inside the mold and the associated suction means may be advantageously arranged at intervals along the edges of the mold, as is clearly visible in FIG. 10, so as to suck uniformly the air trapped underneath the sheet applied to the mold. For example, the suction means may be formed by four connectors on one side and four connectors on the opposite side of the mold.

Again advantageously, the bottom of the mold may have preferably a surface which is not smooth so as to allow better evacuation of the air between the bottom of the mold and the solid PVA film. In order to achieve this, the rubber face of the mold on which the mixture is deposited with the PVA sheet in between instead of being smooth may have a suitable surface roughness, this being achieved for example by using preferably a surface cloth or rubber with a knurled imprint or the like.

Owing to the roughness of the internal surface of the mold, micro-channels for passage of the air are created, these allowing the air to be sucked not only close to the rim of the mold, but also into the centre of the mold (or tray) such that the solid PVA film rests perfectly over the whole of the bottom of the tray without the risk of causing any puckering.

Moreover, if the internal surface of the mold is made of cloth, the PVA film adheres better to the bottom of the tray since the cloth has better gripping properties than rubber.

Figure 12:
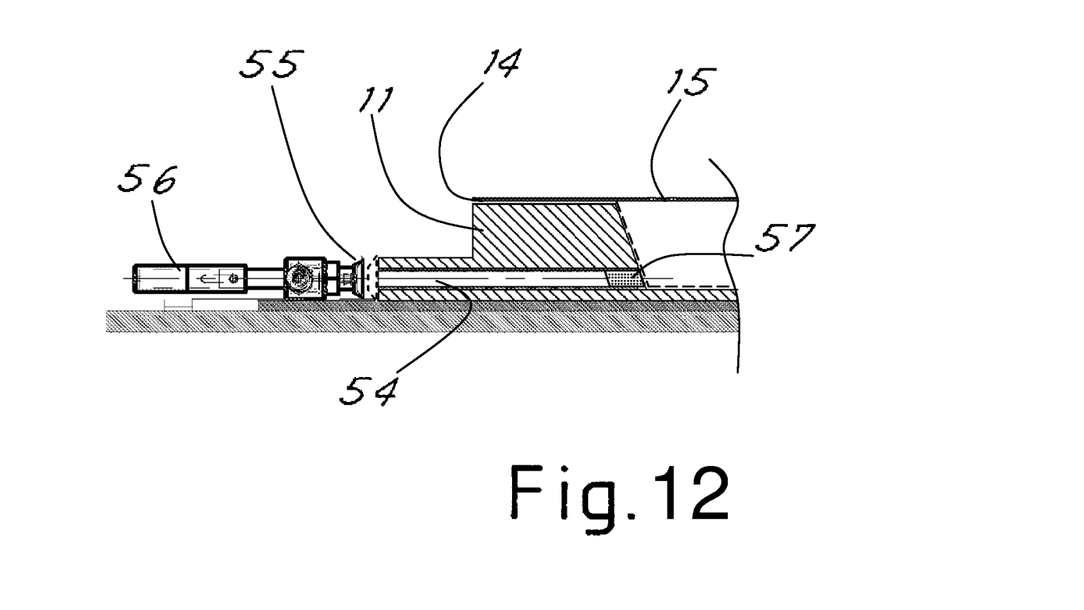
FIG. 12 shows a schematic view, on a larger scale, of a detail shown in FIG. 11.

FIG. 12 shows an enlarged view of an advantageous embodiment of the suction means (in the zone indicated by a broken line circle in FIG. 11) which are designed so as to allow automatic controlled engagement thereof with the aforementioned suction ducts present in the mold.

As can be seen in FIG. 12, the suction ducts (indicated generally by 54) preferably extend so as to emerge laterally inside the internal cavity of the mold, close to the bottom, and thus allow the correct suction of the air even when the PVA sheet starts to move towards the bottom of the mold.

Again in FIG. 12 it can be seen how the suction means 53 may comprise for each duct 54 a sealed connecting end 55 (for example in the form of a suction cup) which, by means of a suitable actuator 56 (for example a pneumatic actuator), is pushed against the end of the duct 54 which emerges outside the mold. Advantageously, the actuator 56 moves the sealed connecting end 55 horizontally between a retracted position, shown in solid lines in FIG. 12, and an advanced operative position, shown in broken lines in FIG. 12, so as to form a seal against the outer end of the duct 54.

The connecting end 55 is in turn connected to a controlled vacuum source or vacuum plant (not shown) so as to suck the air into the internal cavity of the mold through the passage 54. Advantageously, the end of the duct 54 which opens out inside the mold interior is provided with a suitable filter 57 which allows the air to pass through, but prevents for example the sheet 50 from being sucked into the duct 54.

During operation of the plant, when a mold (prepared in accordance with that described with reference to FIGS. 8 and 9) reaches the spreading station 50, the suction means 53 are operated so as to be connected to the ducts 54 present in the mold and suck the air between the bottom of the mold (for example in the form of a tray) and the solid film 15 applied to the edge of the mold.

Consequently, a solid film owing to its extendable nature, stretches and rests against the inner surface of the rim and the bottom of the mold so as to assume its final form, as shown in broken lines in FIG. 12.

The suction time needed for the solid film to be arranged perfectly against the inner surface of the mold may be reduced to only a few seconds. However, for greater reliability, suction may be maintained for a longer period of time before pouring the mixture. Moreover, suction may be maintained also during the entire mixture distribution and spreading operation so as to ensure that the sheet 15 remains stable against the bottom of the mold.

Once the mixture has been poured air suction may be interrupted since the film previously shaped by suction retains its form adhering to the surface of the mold since it is acted on by the weight of the mixture distributed over it.

Figure 13:
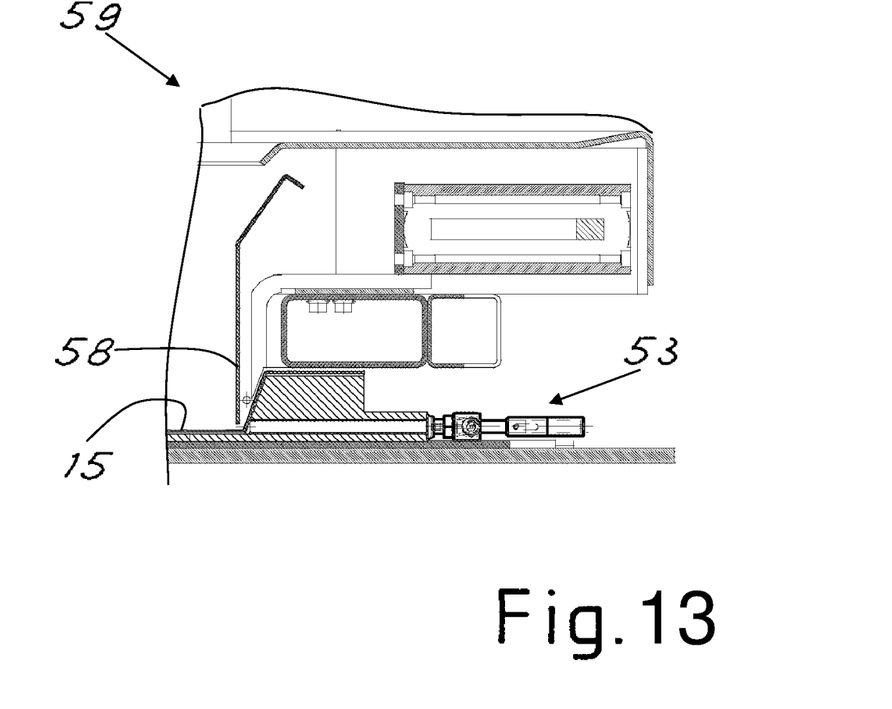
FIG. 13 shows an enlarged schematic view of a detail of the station shown in FIG. 11 in a different operating position.

The spreading station 50 may also preferably comprise a peripheral rim 58 for containing the mixture, which is lowered via drive means (not shown) by a frame 59 and placed on the bottom of the tray in the vicinity of its peripheral edge before the mixture is poured. The rim is shown for example in the raised position in FIG. 11 and in the lowered position inside the mold in the enlarged view of FIG. 13. The rim may also form part of the distribution unit 52 so as to move, at least vertically, together with it.

The function of the peripheral rim is to help contain the mixture when it is distributed inside the tray and prevent part of it from accidentally spilling outside of the tray.

Once the containing rim has been lowered, with suction of the air still active, the mixture is distributed inside the tray. Once distribution of the mixture has been completed, the peripheral containing rim may be raised again and the mold, disconnected from the suction means, may be conveyed away for the subsequent slab production steps.

In any case, once the mold has been filled with the mixture, it may be closed at the top by the appropriate cover, advantageously treated beforehand with PVA film applied for example as already described above. For example, a closing station (substantially known per se and therefore not shown) may pick up the cover, turn it over and deposit it on top of the mixture contained inside the tray.

The tray thus closed and containing the mixture may then be transferred to a forming station (also substantially known per se and therefore not shown) where, preferably, a known step of vacuum vibrocompression of the mixture is performed.

The internal filters 57 present inside the ducts 54 the mold also have the function of preventing the mixture, during vibrocompression, from being pushed inside the passages, tearing the PVA film and/or creating protrusions which would then prevent extraction of the slab from the tray after hardening.

At the end of the production line the covers are finally removed so as to be able to remove the hardened slab. A return line for the covers and trays may also be provided so that they may be cleaned and then used again for application of the solid PVA film, as previously described, and the mold preparation and slab production cycle repeated.

The slabs, after catalysis and hardening, may instead be conveyed away for removal of the PVA sheets. The sheets may be peeled off mechanically (manually or using automatic devices) from the said slab or the slabs may be transferred to a wet-polishing and sizing line with the sheet still applied, where processing water causes dissolving of the sheets which are then removed together with the processing sludges.

At this point it is clear how the predefined objects have been achieved. Owing to the principles of the invention, the surfaces of the mold as suitably protected, the slab produced may be easily separated from the mold, and sufficient adhesion of the protective sheet to the mold during preparation and use of the mold is ensured.

Obviously the description provided above of embodiments applying the innovative principles of the present invention is provided by way of example of these innovative principles and must therefore not be regarded as limiting the scope of the rights claimed herein.

For example, depending on the length of the molds and the distance between stations, the steps of applying the fluid layer and depositing the solid layer may be completely separated temporally or partially overlapped, in the sense that, while the fluid application station is operating on the rear part of the mold, the sheet deposition station is already operating on the front part of the mold.

In any case, once deposition and any flattening has terminated, the mold may leave the preparation plant and continue towards the following slab production steps, if necessary also after a temporary storage period.

As mentioned above, during the following steps, preferably the mixture of agglomerate forming a slab will be distributed in the mold and the latter, if necessary, closed at the top with the cover; the slab will be formed; the slab allowed to undergo the hardening process; the slab extracted from the mold together with the sheet or sheets; and the sheet eliminated from the slab.

The forming process may in turn comprise a known procedure for compaction by means of vibrocompression, optionally under a vacuum, and subsequent hot hardening of the mixture.

Elimination of the sheet may be performed mechanically and/or by means of dissolving of the sheet in water (for example during the mechanical process for finishing the slab surfaces which generally involves wet-polishing and sizing).

All these subsequent processing stages are not shown or described here in greater detail, since they are known per se and may be easily imagined by the person skilled in the art in the light of the description provided here.

Owing to the principles of the invention rubber trays may be used, with all the associated advantages, and it is ensured that parts or traces of the protective sheet do not remain trapped in the slab, even if the mixture undergoes vibrocompression.

During sizing and smoothing of the hardened slab, the extra thickness of material to be removed will therefore be smaller in nature.

As a result the thickness of the layer of mixture to be distributed inside the tray may be reduced and, therefore, the quantity of mixture strictly needed for each slab may be used.

There is also a reduction in the energy costs and costs of tools needed for processing of the slab, as well as a reduction in the amount of processing sludges.

Although the application of the fluid by means of contact, in particular using a device with an applicator element has described above, has been found to be preferable in order to obtain more uniform release of the layer of fluid and greater control over its small thickness, the first station 21 for applying the fluid agent layer may also alternatively comprise suitable nozzles located in the fluid release zone so as to spray the fluid directly towards the surface of the mold which is passing through the zone. Moreover, other known contact application elements and devices may be used.

The application of the fluid between mold and sheet and the application of the sheet may also be performed at much shorter time intervals and in a much smaller space compared to that shown and described. For example, the fluid may be applied directly in the sheet deposition station, immediately before the sheet touches the mold surface to which it must adhere, so as to be arranged between the sheet and the mold surface and not necessarily spread beforehand over the mold surface.

The form, dimensions and proportions of the various parts of the mold and the plant may vary with respect to those shown here, depending on the specific requirements. Moreover, the plant may comprise known accessory elements for management thereof, synchronization of the operations, detection of the passage of the mold parts for activation of the various mechanisms, etc.

In order to protect very wide molds, two or more rolls of solid film arranged in parallel may also be used, so that the film of each roll covers only a part of the surface of the mold. This could be useful for example in the case where slabs of considerable width must be produced.

The invention claimed is:

1. Method for production of slabs from a mixture of agglomerate, the method comprising the steps of:
   providing a mold (10) having an internal surface;
   applying a layer (14) of a fluid adhesive agent containing PVA in a solution to at least some areas of the internal surface of the mold (10);
   depositing over the layer (14) at least one sheet (15) of PVA-based plastic material such that the layer (14) is positioned between the at least one sheet (15) and the at least some areas of the internal surface of the mold (10);
   introducing the mixture of agglomerate into the mold (10) such that the mixture is in contact with the at least one sheet (15); and
   carrying out a slab forming process to transform the mixture inside the mold (10) into a slab.

2. Method according to claim 1, characterized in that after the step of depositing the at least one sheet (15) over the layer (14), a step of flattening or stretching the at least one sheet (15) against the internal surface of the mold (10) is performed.

3. Method according to claim 2, characterized in that the flattening or stretching step occurs at least partially by means of a mechanical action on the sheet (15).

4. Method according to claim 2, characterized in that the flattening or stretching step occurs at least partially by means of suction of the air between sheet (15) and mold (10).

5. Method according to claim 4, characterized in that the mold (10) comprises a peripheral edge (13) of the mold and suction of the air occurs through suction ducts (54) present along the peripheral edge of the mold so as to emerge inside the mold interior which is defined by said peripheral edge (13).

6. Method according to claim 4, characterized in that the suction occurs before and/or during a step of distribution of the mixture inside the mold.

7. Method according to claim 1, characterized in that the layer (14) of fluid adhesive agent is applied by means of mechanical contact with an applicator element soaked or coated with said fluid adhesive agent.

8. Method according to claim 1, characterized in that the solution containing PVA (polyvinyl alcohol) of the fluid adhesive agent comprises water and optionally glycerin.

9. Method according to claim 1, characterized in that the average amount of fluid adhesive agent applied is between 2 g/m$^2$ and 10 g/m$^2$, and/or the sheet (15) of PVA-based plastic material has a gram weight of between 20 g/m$^2$ and 60 g/m$^2$.

10. Method according to claim 1, characterized in that the mold (10) is a flexible sheath made of elastomeric material and/or cloth.

11. Method according to claim 2, characterized in that the mold (10) comprises a tray-like base portion and a cover portion to be superimposed on the tray-like base portion, wherein during the step of flattening the sheet (15), the sheet (15) is flattened in the tray-like base portion by means of suction of the air between sheet (15) and the tray-like base portion, and the sheet (15) is flattened in the cover portion by means of mechanical action on the sheet (15).

12. Method according to claim 1, further comprising the steps of:
   carrying out a process of hardening the slab to consolidate it;
   extracting from the mold (10) the slab together with the sheet (15); and
   removing the sheet (15) from the slab.

13. The method according to claim 12, wherein the sheet (15) is removed from the slab by placing the sheet (15) and the slab in water and dissolving the sheet (15).

14. A system comprising:
   a fluid adhesive agent containing PVA in a solution;
   at least one sheet (15) of PVA-based plastic material;
   a mold (10) having an internal surface;
   a first station (21) configured for applying a layer (14) of the fluid adhesive agent to at least some areas of the internal surface of the mold (10); and
   a second station (22) arranged after the first station (21) and configured for depositing the sheet (15) of PVA-based plastic material on the layer (14).

15. System according to claim 14, characterized in that the first station (21) comprises an applicator element (25) soaked or coated with said fluid agent so as to transfer the fluid agent by means of contact on a mold surface that passes through a zone (26) for releasing the fluid of the applicator element (25).

16. System according to claim 15, characterized in that the applicator element (25) comprises a belt running between a zone (28) for removal of the fluid, so as to be soaked or coated with fluid, and the zone (26) for releasing the fluid.

17. System according to claim 14, characterized in that the second station comprises a device (33, 34, 35) for releasing the sheet in the form of a strip of film (15b) which is unrolled from a reel (33) and a device (39) for transversely cutting the strip of film to form the sheet.

18. System according to claim 14, characterized in that the second station (22) comprises or is followed by a flattening device (24, 53) for smoothing the sheet against the mold surface.

19. System according to claim 18, characterized in that the flattening device (24) comprises a pressure roller (46) which has a rotation axis transverse to a direction of movement of the mold (10) and which is pushed so as to act on the sheet (15).

20. System according to claim 18, characterized in that the flattening device comprises suction means (53) for sucking the air between sheet and mold.

21. System according to claim 20, characterized in that the suction means (53) are arranged in a station (50) and are movable on command so as to connect to/disconnect from suction ducts (54) present in the mold (10).

22. Mold (10) intended to form a slab from a mixture of agglomerate, comprising:
- a base portion (11) and a cover (12) configured to be superimposed on the base portion, each having an internal surface;
- at least one sheet (15) of PVA-based plastic material covering the internal surface of the base portion (11) and forming a surface that is intended for contact with the mixture of agglomerate to be introduced into the mold (10) for forming the slab;
- a layer (14) of a fluid adhesive agent containing PVA in a solution provided between the at least one sheet (15) and at least some areas of said internal surface of the base portion (11).

23. Mold according to claim 22, comprising suction ducts (54) which are configured to connect a space defined between the internal surface of the base portion (11) and the sheet (15) to an external suction means for flattening or stretching the sheet (15) against the internal surface of the base portion (11) by means of a vacuum.

24. Mold according to claim 23, characterized in that the suction ducts (54) comprise filters (57) arranged at one end of the ducts which leads into the mold.

25. Mold according to claim 22, characterized in that the internal surface of the mold is at least partially made with a cloth or of rubber with a knurled surface.

* * * * *